A. McLeod,

Stump Extractor.

No. 97,102. Patented Nov. 23, 1869.

United States Patent Office.

ALEXANDER McLEOD, OF BLACK RIVER FALLS, WISCONSIN.

Letters Patent No. 97,102, dated November 23, 1869.

IMPROVEMENT IN STUMP-EXTRACTOR.

The Schedule referred to in these Letters Patent and making part of the same.

*To all whom it may concern:*

Be it known that I, ALEXANDER MCLEOD, of Black River Falls, in the county of Jackson, and State of Wisconsin, have invented a new and useful Improvement in Stump-Extractors; and I do hereby declare that the following is a full, clear, and exact description thereof, which will enable others skilled in the art to make and use the same, reference being had to the accompanying drawings, forming part of this specification.

The object of this invention is to furnish a simple, convenient, powerful, and effective machine for extracting stumps from the ground; and It consists in a combination and arrangement of mechanical appliances, as hereinafter described.

In the accompanying drawing—

Figure 1:
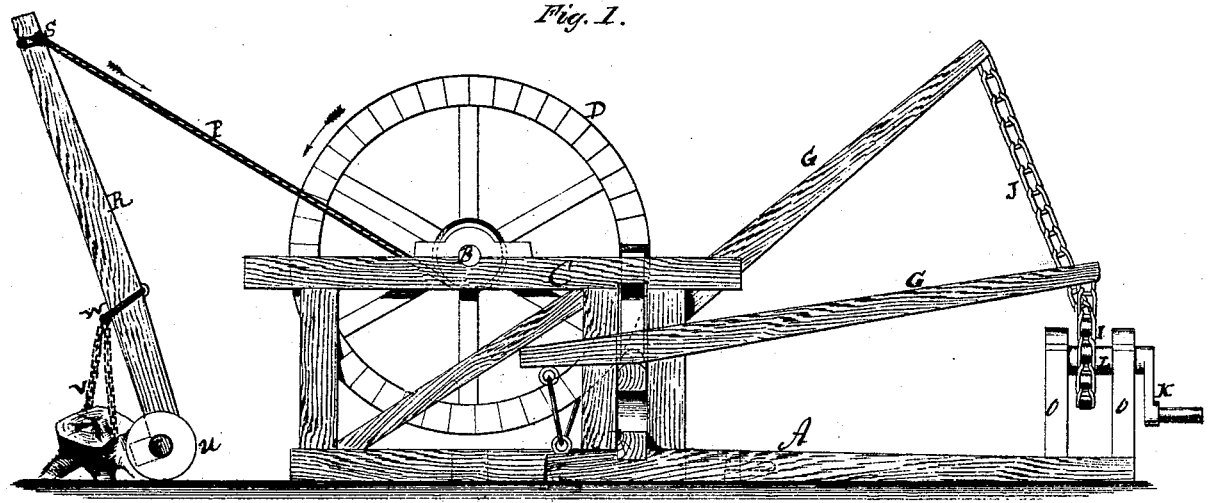
Figure 2:
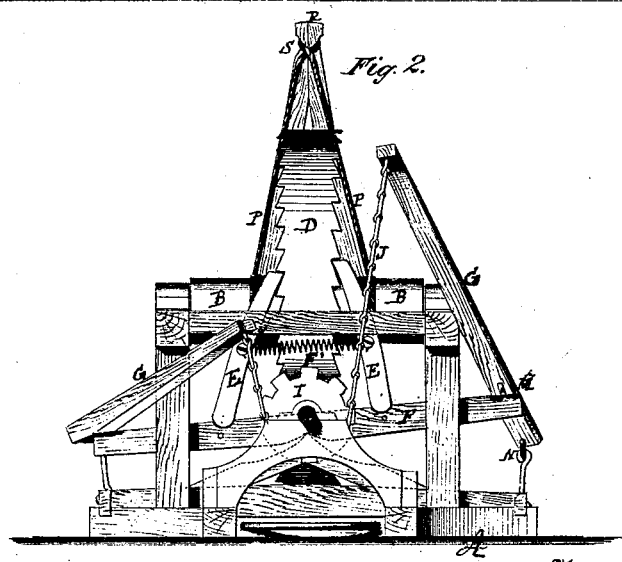

Figure 1 represents a side elevation of the machine.
Figure 2 is an end elevation.

Similar letters of reference indicate corresponding parts.

A is the base-frame of the machine, which I prefer to mount on wheels, for convenience in moving from place to place.

B is an axle, the journals of which revolve in boxes on the frame, marked C, which is rigidly connected with the base, A.

To the axle B is securely attached a wheel, D, having ratchet-teeth formed on each side of its rim.

E E represent two pawls, which engage with the ratchet-teeth on the sides of the wheel D, as shown in fig. 2.

The pawls E are pivoted to the oscillating bar F, and are pressed against the ratchet-teeth by the spring F', which extends from one pawl to the other.

The bar F rests on a central point in the frame, on which it works.

G G represent levers, the short ends of which are securely connected with the base-frame A by the short chains H, or by any other suitable means.

The long ends of these levers G are connected with a chain-wheel, I, by the chain J, the cogs of which take hold of the links of the chain, as that wheel is vibrated back and forth by means of the crank K on the shaft L of the wheel.

The levers G G rest on the ends of the oscillating bar F, as seen at M, which is the resisting-point, while the point N is the fulcrum.

It will be seen, that by vibrating the crank, the chain, by means of the cogs on the wheel, with which the links engage, will serve to alternately raise and depress the levers G, and thereby operate the pawls and revolve the ratchet-wheel.

The chain-wheel I, by its shaft L, is supported on suitable pillow-blocks o o, on the extended portion of the frame-timbers A, as seen in fig. 1.

P is a rope, chain, or cable, of any description, the ends of which are attached to the axle B of the ratchet-wheel.

R is the hoisting-lever, to the end of which the cable P is attached, as seen at S in the drawing. The other end of this lever is attached to the axle T of a pair of truck-wheels U. These truck-wheels form the fulcrum to the hoisting-lever. This lever may be double, with its lower ends spread where it connects with the truck-axle, with its other end forming a single piece, the parts being secured together by bolts or bands.

V is the hoisting-chain, by which the stump is raised. This chain is attached to the lever by means of the device W.

The operation will be readily understood from the drawing.

By working the crank K, the ratchet-wheel will be revolved, which will wind up the cable P upon the axle B. This will draw upon the long end of the hoisting-lever with great force, the effect being to raise the stump from the ground, and load it on to the truck.

In moving the truck, either to the stump or carrying the stump away, the hoisting-lever R is used as a tongue, to which the team is attached for drawing the truck.

It will be seen that the power applied to the crank K is so multiplied by this arrangement, that an irresistible force is exerted on the stump.

The machine is simple in all its parts, not liable to break or get out of order, and most effective in its operation.

Having thus described my invention,

I claim as new, and desire to secure by Letters Patent—

1. The combination of the pawls E, oscillating bar F, levers G, chain J, wheel I, and frame C A, with each other, and with the wheel and axle D B, arranged and operating substantially as and for the purposes described.

2. The combination of the hoisting-lever R, trucks U, cable P, axle and wheel B D, pawls E, oscillating bar F, chain J, wheel I, and frame C A, substantially as shown and described, for the purposes set forth.

ALEXANDER McLEOD.

Witnesses:
 GEO. V. SUMNER,
 FRANK COOPER.